(12) United States Patent
Cheng et al.

(10) Patent No.: US 9,776,538 B1
(45) Date of Patent: Oct. 3, 2017

(54) ARMREST HINGE WITH CABLE PASS-THROUGH

(71) Applicant: Lear Corporation, Southfield, MI (US)

(72) Inventors: Peng Cheng, Shanghai (CN); Wu XiaoZhong, Shanghai (CN); Mao Zhengda, Shanghai (CN); Wang YuLiang, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/373,134

(22) Filed: Dec. 8, 2016

(51) Int. Cl.
*B60N 2/46* (2006.01)
*B60N 2/68* (2006.01)

(52) U.S. Cl.
CPC ........... *B60N 2/4606* (2013.01); *B60N 2/682* (2013.01)

(58) Field of Classification Search
CPC .............................. B60N 2/4606; B60N 2/682
USPC ...................................... 297/113, 117, 217.3
See application file for complete search history.

(56) References Cited

U.S. PATENT DOCUMENTS

| 5,287,412 A * | 2/1994 | Etzel ................... B60R 11/0217 |
| | | 297/113 |
| 7,726,853 B2 | 6/2010 | Li et al. |
| 7,978,263 B2 | 7/2011 | Eldon et al. |
| 8,960,786 B2 | 2/2015 | Henke et al. |
| 9,022,328 B2 | 5/2015 | Mayer |
| 2002/0112320 A1 | 8/2002 | Hayashi |
| 2004/0021349 A1* | 2/2004 | Longtin ............... B60N 2/4606 |
| | | 297/217.3 |
| 2013/0278038 A1* | 10/2013 | Tame ................... B60N 2/4606 |
| | | 297/411.34 |

* cited by examiner

*Primary Examiner* — Anthony D Barfield
(74) *Attorney, Agent, or Firm* — MacMillan, Sobanski & Todd, LLC

(57) ABSTRACT

A vehicle armrest assembly includes a seat frame. An armrest is attached to the seat frame for relative rotational movement about a pivot axis. The armrest includes a hinge that includes a hinge pass-through. The hinge pass-through is located around the pivot axis. The armrest includes an electronic module. A module line extends from the electronic module to a connector mounted on the seat frame. The module line is located partially within the hinge pass-through.

8 Claims, 6 Drawing Sheets

ARMREST HINGE WITH CABLE PASS-THROUGH

BACKGROUND OF THE INVENTION

This invention relates in general to movable vehicle armrests. In particular, this invention relates to an improved structure for a movable vehicle armrest having one or more switches or other devices provided thereon for controlling the operation of one or more mechanical or electrical systems provided in the vehicle.

Vehicles, such as passenger cars, typically include armrests for the comfort of vehicle occupants. Often, such as in vehicles having a bench-type seat, an armrest is provided that may be moved between a lowered use position and a raised storage position. In the use position, the armrest is positioned adjacent to a bottom portion of the seat for use by occupants of the seat located on either side of the armrest. In the storage position, the armrest is positioned adjacent to a back portion of the seat such that a center portion of the seat is available for use, such as by a third occupant of the seat, for example.

In some instances, a vehicle armrest may include additional features for the convenience and comfort of the vehicle occupants. For example, a vehicle armrest may include one or more switches or other devices for controlling the operation of one or more mechanical or electrical systems provided in the vehicle. Positioning these switches or other devices on the vehicle armrest can make them conveniently accessible for occupants on either side of the vehicle armrest.

Typically, these switches or other devices controls are connected to the mechanical or electrical systems by wires or other structures. For a variety of reasons, it is desirable that such wires or other structures be located where they are not normally visible or otherwise readily accessible to the occupants of the vehicle. It would be desirable to provide an improved structure for a movable vehicle armrest having one or more switches or other devices provided thereon for controlling the operation of one or more mechanical or electrical systems provided in the vehicle.

SUMMARY OF THE INVENTION

This invention relates to a vehicle armrest assembly. The armrest assembly includes a seat frame. An armrest is attached to the seat frame for relative rotational movement about a pivot axis. The armrest includes a hinge that includes a hinge pass-through. The hinge pass-through is located around the pivot axis. The armrest includes an electronic module. A module line extends from the electronic module to a connector mounted on the seat frame. The module line is located partially within the hinge pass-through.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
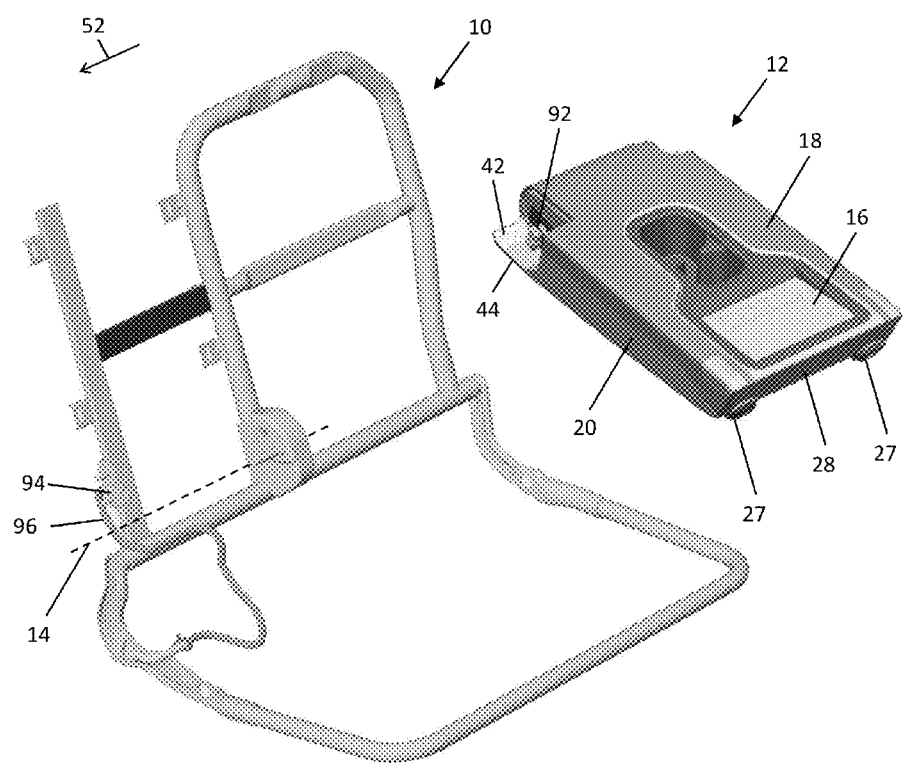
FIG. 1 is an exploded perspective view of a vehicle seat frame and a movable vehicle armrest in accordance with this invention.

Referring now to the drawings, there is illustrated in FIG. 1 a portion of a seat frame, indicated generally at 10, and an armrest, indicated generally at 12. The armrest 12 is supported on the seat frame 12 for relative movement about a pivot axis 14, such as described above. The illustrated seat frame 10 is a portion of a bench seat, but may be any desired type of seat. The illustrated armrest 12 is a center armrest, but may be any desired type of armrest. The armrest 12 includes an electronics module 16. The illustrated electronics module 16 is an audio play-back system, but may be embodied as one or more switches or any other devices for controlling the operation of one or more mechanical or electrical systems provided in the vehicle. The electronics module 16 is located on a first side 18 of the armrest 12, but may be placed in any desired location on the armrest 12. The armrest 12 includes an optional trim piece 20 that covers the armrest 12. The illustrated trim piece 20 is made of leather, but may be any desired material.

Figure 2:
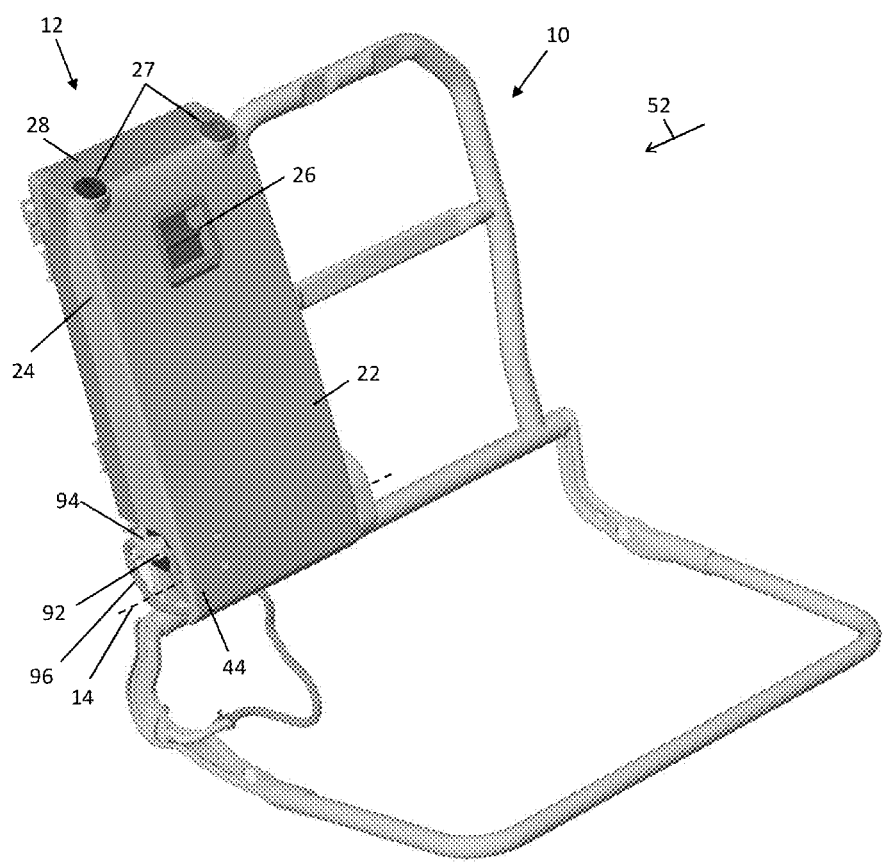
FIG. 2 is a perspective view of the vehicle seat frame and the movable vehicle armrest shown in FIG. 1 shown assembled.

Referring now to FIG. 2, the armrest 12 is shown installed on the seat frame 10, and the armrest 12 is illustrated with the trim piece 20 removed so that underlying components of the armrest 12 are visible. The armrest 12 is illustrated in a raised storage position relative to the seat frame 10. The first side 18 is positioned adjacent the seat frame 10 and is not visible in FIG. 2, while a second side 22 of the armrest 12 is visible.

The armrest 12 includes an armrest foam 24 on the second side 22. However, the armrest 12 may include any desired material on the second side 22. The armrest 12 includes a release handle 26 on the second side 22. The armrest 12 is detained in the stowed position relative to the seat frame. The release handle 26 may be actuated in order to release the armrest 12 for movement relative to the seat frame 10 about the pivot axis 14. The armrest 12 also includes optional headrest mounts 27 located at a front end 28 of the armrest 12 which allow a headrest (not shown) to be attached to the armrest 12.

Figure 3:
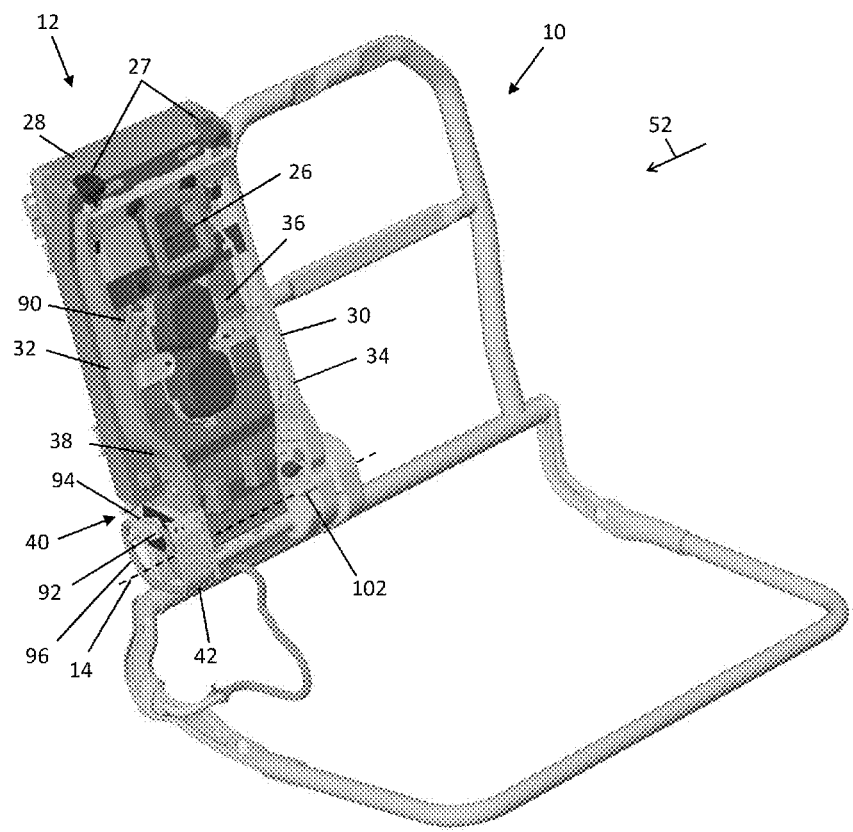
FIG. 3 is a perspective view similar to FIG. 2 with a portion of the movable vehicle armrest removed so that an armrest frame is visible.

Referring now to FIG. 3, a view similar to that shown in FIG. 2 is illustrated, with the armrest foam 24 removed so that underlying components of the armrest 12 are visible. The armrest 12 includes an armrest frame 30, which includes a first side frame 32 and a second side frame 34. The armrest frame 30 defines an interior space, indicated at 36. The first side frame 32 and the second side frame 34 extend from the pivot axis 14 toward the front end 28 of the armrest 12. The armrest frame 30 includes an offset portion 38, wherein the first side frame 32 deflects into the interior space 36. The offset portion 38 defines an exterior space, indicated at 40. The exterior space 40 is a space that is located outside of the armrest frame 30, but within the armrest 12. The exterior space 40 may be created without the offset 38, if desired. The illustrated second side frame 34 is generally linear, but may have any desired shape.

The armrest 12 includes a shield 42 that extends over the exterior space 40. The illustrated shield 42 is made of plastic, but may be made of any desired material. The illustrated shield 42 is attached to the first side frame 32, but may be attached to any desired portion of the armrest 12. As best understood with reference to FIG. 2, the shield 42 is located between the exterior space 40 and a supported portion 44 of the armrest foam 24. The supported portion 44 is a relatively thin portion of the armrest foam 24 and the shield 42 prevents the armrest foam 24 from deflecting into the exterior space 40.

Figure 4:
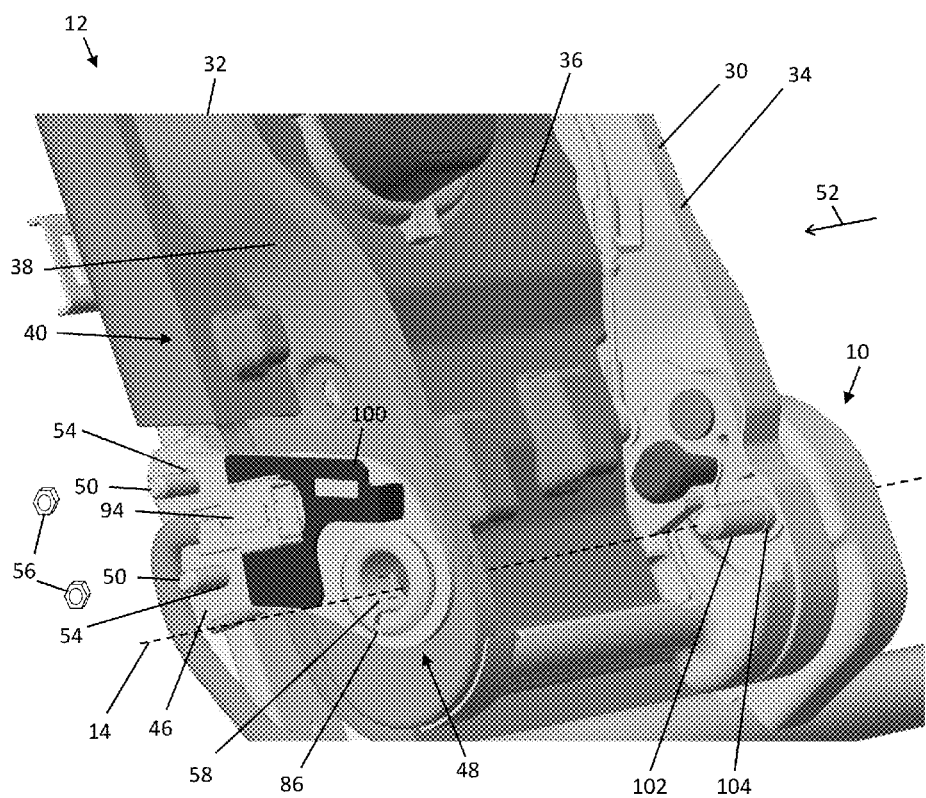
FIG. 4 is an enlarged exploded perspective view of portions of the movable vehicle armrest and armrest frame shown in FIG. 3 showing a pass-through hinge.

Referring now to FIG. 4, an enlarged view of a portion of the armrest 12 near the pivot axis 14 is shown. FIG. 4 is illustrated with the shield 42 removed so that underlying components of the armrest 12 are visible. The first side frame 32 is attached to a hinge plate 46 by a hinge 48 for relative movement about the pivot axis 14. The hinge plate 46 is fixed relative to the seat frame 10. In the illustrated embodiment, the seat frame 10 includes two plate projections 50 that extend in an installation direction 52. However, any desired number of plate projections 50 may be used. The hinge plate 46 includes two holes 54 that accommodate the plate projections 50. Nuts 56 are threaded onto the plate projections 50 to retain the hinge plate 46 in place relative to the seat frame 10. Alternatively, the hinge plate 46 may be attached to the seat frame 10 using any other desired connector or method.

Figure 5:
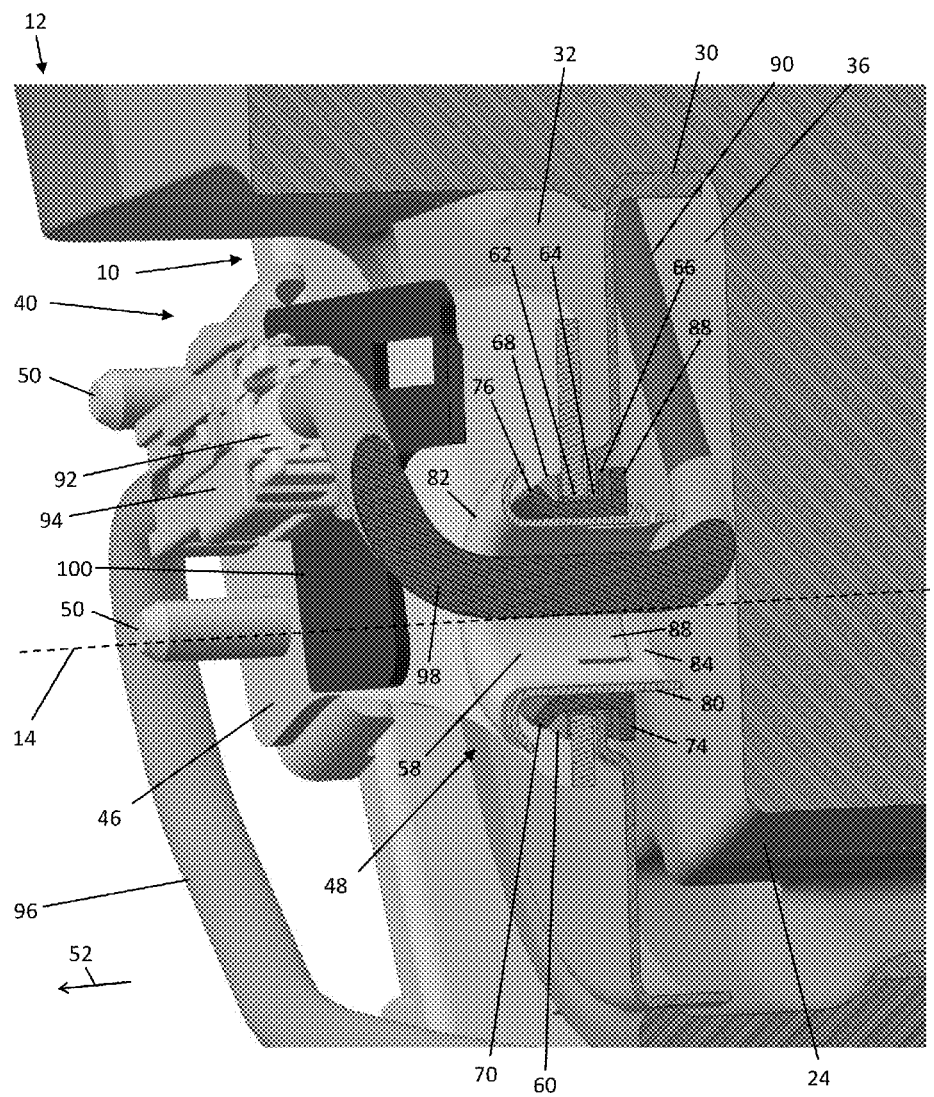
FIG. 5 is a further enlarged perspective view, partially in cross sectional, of portions of the movable vehicle armrest and armrest frame shown in FIG. 3 including the pass-through hinge.
Figure 6:
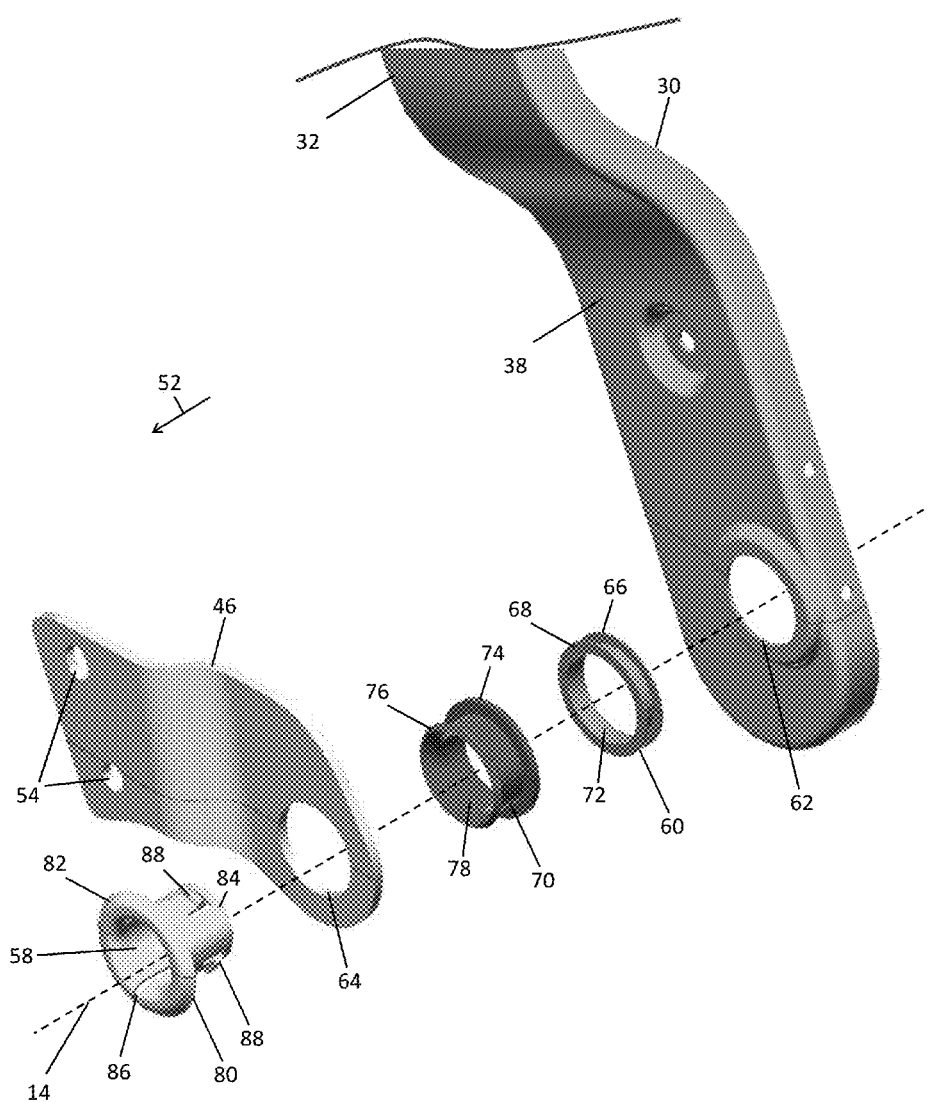
FIG. 6 is an exploded perspective view of the pass-through hinge shown in FIGS. 4 and 5.

Referring now to FIG. 5, a cross-sectional view taken through the hinge 48 is shown, taken along the pivot axis 14. The cross-section illustrated in FIG. 5 shows the complete armrest 12, including the armrest foam 24. An exploded view of the hinge 48 is shown in FIG. 6, and the hinge 48 is best understood in reference to these two figures. As previously described, the hinge plate 46 is fixed to the seat frame 10, and the first side frame 32 is attached to a hinge plate 46 for relative rotational movement. The hinge 48 includes a pass-through 58 that is an opening that extends from the interior space 36 to the exterior space 40 and is located around the pivot axis 14.

The hinge 48 includes a bushing 60 that is made of metal with a friction-controlling coating. However, the bushing 60 may be made of any desired material. The bushing 60 is located in both a frame opening 62 in the armrest frame 30 and a plate opening 64 in the hinge plate 46. The bushing 60 includes an inner bushing arm 66 that is located in the interior space 36 and engages the first side frame 32. The bushing 60 also includes an outer bushing arm 68 that is located in the exterior space 40 and engages the hinge plate 46. The bushing 60 serves to control the amount of friction experience when the armrest frame 30 moves relative to the hinge plate 46.

The hinge 48 also includes a hinge lock 70 that is located in a bushing pass-through 72. The illustrated hinge lock 70 is made of metal, but may be made of any desired material. The hinge lock 70 includes an inner lock arm 74 that is located in the interior space 36 and an outer lock arm 76 that is located in the exterior space 40. The hinge lock 70 is a structural reinforcement and serves to retain the armrest frame 30 in position relative to the hinge plate 46 while allowing relative movement therebetween. The illustrated hinge lock 70 is attached around the bushing 60 by riveting, but may be attached by any desired method. The hinge lock 70 includes a lock pass-through 78 that extends from the interior space 36 to the exterior space 40 and is located around the pivot axis 14.

The hinge 48 also includes a hinge liner 80 that is located partially in the lock pass-through 78. The illustrated hinge liner 80 is made of plastic, but may be made of any desired material. The hinge liner 80 includes a curved outer liner 82 that is located in the exterior space 40. The hinge liner 80 also includes a tube-shaped liner channel 84 that extends from the outer liner 82. The liner channel 84 is located in the lock pass-through 78 and extends into the interior space 36. As best seen in FIG. 6, the hinge liner 80 includes a longitudinal gap 86 that extends generally parallel to the pivot axis 14 through the outer liner 82 and the liner channel 84. During assembly, the liner channel 84 is inserted into the lock pass-through 78. The gap 86 allows the hinge liner 80 to deflect in order to fit in the lock pass-through 78. The liner channel 84 includes a plurality of locking arms 88 that engage the inner lock arm 74, as shown in FIG. 5. Additionally, the outer liner 82 engages the outer lock arm 76. The hinge liner 80 is retained in the lock pass-through 78 by the engagement with the hinge lock 70 at either end.

The armrest 12 includes a module line 90 that is located at least partially in the interior space 36. The module line 90 is a wire bundle that is attached to the electronics module 16 (which is not visible in FIG. 5). It should be appreciated that the module line 90 may be any desired type of wire, cable, or other structure and may include power and communication cables, as desired. The module line 90 extends from the electronic module 16 to an armrest connector 92 which is connected to a seat connector 94. In the illustrated embodiment, the armrest connector 92 is a male connector and the seat connector 94 is a female connector, but any desired connectors may be used. A seat line 96 extends from the seat connector 94 and may be connected to any desired electronics systems (not shown). The module 90 and the seat line 96 provide a wire path 98, which is located partially in the pass-through 58 of the hinge 48 in order to pass between the interior space 36 and the exterior space 40.

In the illustrated embodiment, the seat connector 94 is attached to a connector plate 100 that is fixed on the seat frame 10. The seat connector 94 is located in the exterior space 40. The module line 90 is located partially in the pass-through 58 and the armrest connector 92 is connected to the seat connector 94 in the exterior space 40. It should be appreciated that the hinge liner 80 is provided to prevent the module line 90 from engaging the hinge lock 70 in order to prevent the metal hinge lock 70 from damaging the module line 90.

Referring back to FIG. 4, the second side frame 34 rotates relative to the seat frame 10 about an axle 102. In the illustrated embodiment, the axle 102 is fixed relative to the seat frame 10 and extends in the installation direction 52. The axle 102 is located in an axle opening 104 on the armrest frame 30 and is located along the pivot axis 14. However, the second side frame 34 may be attached to the seat frame 10 using any desired rotational connection.

One method of attaching the illustrated armrest 12 to the seat frame 10 includes providing the assembled armrest 12, including the hinge 48 and the attached hinge plate 46. The armrest 12 is then slid onto the axle 102, which passes through the axle opening 104 on the second side frame 34, and the projections 50, which pass through the holes 54 on the hinge plate 56. The nuts 56 are then threaded onto the projections 50 in order to fix the hinge plate 46 in position relative to the seat frame 10. The armrest connector 92 is then plugged into the seat connector 94.

At this point, the armrest 12 may be moved relative to the seat frame 10, rotating relative to the hinge plate 46 and the axle 102. The module line 90 will remain connected to the electronic module 16 and the seat connector 94. The hinge liner 80 will help prevent the module line 90 from being damaged where it passes through the hinge 48.

In the preceding description of the preferred embodiment of the hinge 48, the armrest 12 attached to the seat frame 10 was used as an example. However, it should be appreciated that the hinge 48 may be used with any desired rotational connection.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle armrest assembly comprising:
   a seat frame;
   an armrest attached to the seat frame for relative movement about a pivot axis, the armrest including a hinge that includes a hinge pass-through that is located around the pivot axis;
   a module located on the armrest; and
   a module line that extends from the module to a connector mounted on the seat frame and is located partially within the hinge pass-through.

2. The vehicle armrest assembly of claim 1, further including an armrest frame that defines an interior space, wherein the hinge pass-through extends from the interior space to an exterior space.

3. The vehicle armrest assembly of claim 2, the armrest further including a shield that extends over the exterior space.

4. The vehicle armrest assembly of claim 3, the armrest further including an armrest foam, wherein the shield is located between the exterior space and a supported portion of the armrest foam.

5. The vehicle armrest assembly of claim 4, wherein the armrest frame includes an offset which defines a portion of the exterior space.

6. The vehicle armrest assembly of claim 1, the armrest including an armrest frame that defines an interior space, a hinge plate that is mounted for relative rotational movement, and a hinge lock that retains the hinge plate in position relative to the armrest frame and includes an inner lock arm located in the interior space an outer lock arm located in an exterior space, and a lock pass-through that extends from the interior space to the exterior space and is located around the pivot axis.

7. The vehicle armrest assembly of claim 6, wherein the seat frame includes an axle that extends in an installation direction and a plate projection that extends in the installation direction, and wherein the axle is located in an axle opening on the armrest frame and the plate projection is located in a hole on the hinge plate.

8. The vehicle armrest assembly of claim 7, wherein the axle is located on the pivot axis.

* * * * *